United States Patent
McColgan et al.

(10) Patent No.: US 7,979,906 B2
(45) Date of Patent: Jul. 12, 2011

(54) METHOD AND SYSTEM FOR MULTIFACETED SCANNING

(75) Inventors: Brian McColgan, Toronto (CA); Gaelle Martin-Cocher, Toronto (CA); Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 949 days.

(21) Appl. No.: 11/867,880

(22) Filed: Oct. 5, 2007

(65) Prior Publication Data

US 2009/0094222 A1    Apr. 9, 2009

(51) Int. Cl.
H04L 9/00     (2006.01)

(52) U.S. Cl. .............................. 726/24; 380/55; 380/243

(58) Field of Classification Search .................... 726/13
See application file for complete search history.

(56) References Cited

U.S. PATENT DOCUMENTS

| | | | |
|---|---|---|---|
| 6,085,224 A | 7/2000 | Wagner | |
| 7,640,318 B1 * | 12/2009 | Hull et al. | 709/217 |
| 2002/0073042 A1 * | 6/2002 | Maritzen et al. | 705/64 |
| 2003/0051054 A1 | 3/2003 | Redlich et al. | |
| 2004/0006767 A1 | 1/2004 | Robson et al. | |
| 2004/0189873 A1 | 9/2004 | Konig et al. | |
| 2007/0146773 A1 * | 6/2007 | Harrington et al. | 358/1.15 |
| 2008/0271110 A1 * | 10/2008 | Graves et al. | 726/1 |

FOREIGN PATENT DOCUMENTS

| | | |
|---|---|---|
| GB | 2400197 A | 10/2004 |
| WO | 9322723 | 11/1993 |
| WO | 9905814 | 2/1999 |

OTHER PUBLICATIONS

Aho A V et al: "AWK—A Pattern Scanning and Processing Language" Software Practice & Experience, Wiley & Sons, Bognor Regis, GB, vol. 9, No. 4, Apr. 1, 1979, pp. 267-279, XP000610135 ISSN: 0038-0644.

Extended European Search Report, EP 07117989.9 dated Mar. 23, 2009.

* cited by examiner

Primary Examiner — Matthew B Smithers
(74) Attorney, Agent, or Firm — Moffat & Co.

(57) ABSTRACT

A method and system for multifaceted scanning, the method having the steps of receiving a data source; processing the data source for a plurality of scanning aspects, the processing step utilizing rules and policies for the plurality of scanning aspects to provide transformed, modified or adapted content; and outputting the transformed, modified or adapted content.

21 Claims, 6 Drawing Sheets

METHOD AND SYSTEM FOR MULTIFACETED SCANNING

FIELD OF THE DISCLOSURE

The present disclosure relates to scanning of data sources and, in particular, to multifaceted scanning of various data sources.

BACKGROUND

Data sources are currently scanned for a variety of purposes. For example, files can be scanned for viruses at predetermined locations. One example is the McAfee Vitran™ solution which combines heuristics and virus detection at predetermined locations and provides for isolation of suspect files. However, this solution is limited to virus scanning only.

In other solutions, specific data streams can be scanned for inappropriate content. For example, Microsoft's Internet Explorer™ provides for a Content Advisor that filters content based on user pre-selected criteria and rating placed on a web site. The Content Advisor in this case can filter content that creates fear, depicts drug or alcohol use, shows sexuality or nudity, among others. The filtering can be complete or limited based on the context of the web site. Other content scanning solutions include Net Nanny™ or Surfwatch™.

These solutions are, however, limited to one type of scanning and typically are performed on a specific data stream or file.

BRIEF DESCRIPTION OF THE DRAWINGS

The present disclosure will be better understood with reference to the drawings in which.

DETAILED DESCRIPTION

Figure 1:
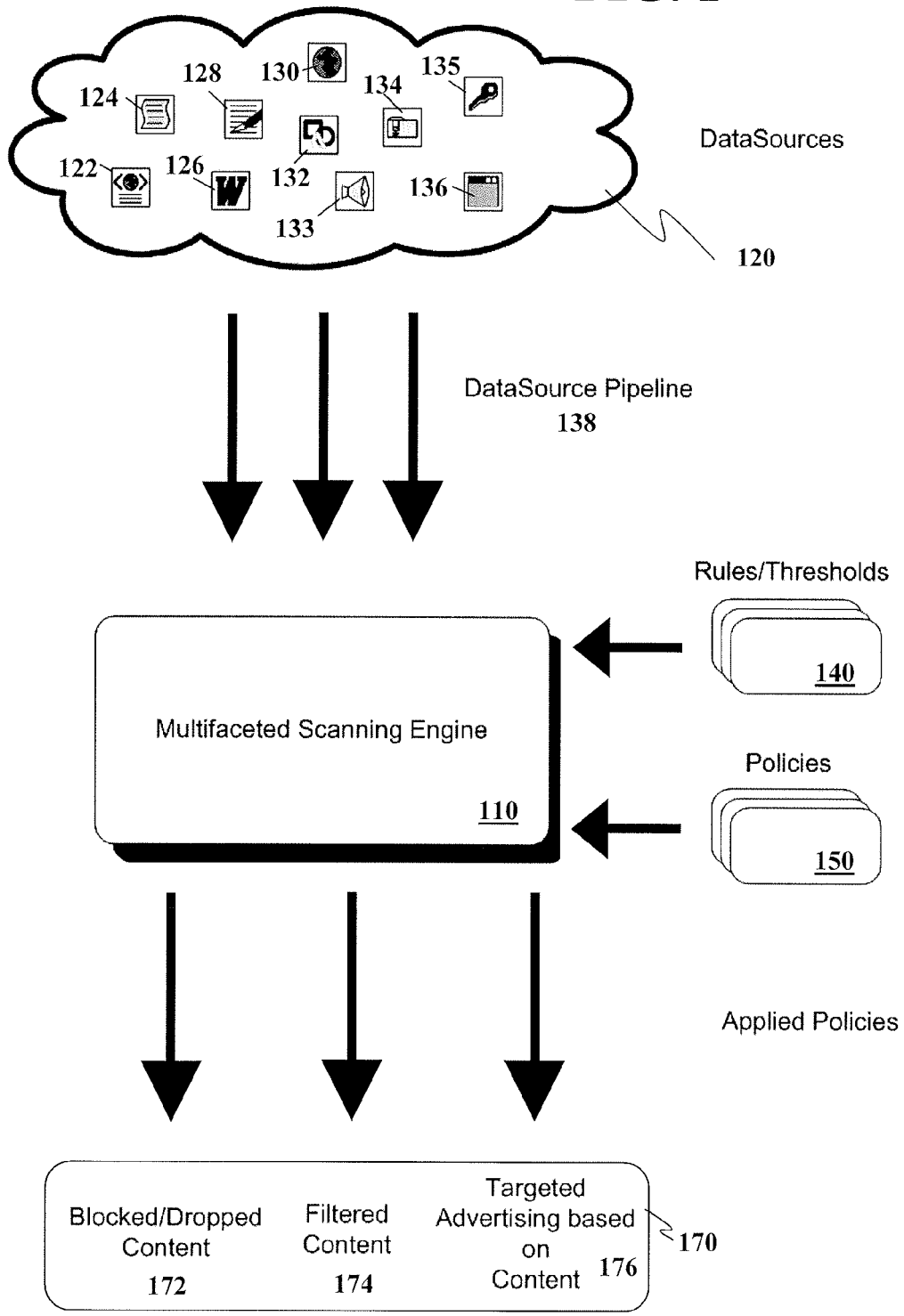
FIG. 1 is a block diagram showing inputs and outputs from a multifaceted scanning engine.

The present disclosure provides for multifaceted scanning on various data streams utilizing a plurality of scanning aspects. In particular, the present disclosure provides for a multifaceted scanning engine on any network element within a wired or wireless environment.

The multifaceted scanning engine is a listener to a data source pipeline. The data source can be an arbitrary data source type or can be one of a plurality of defined data source types.

The multifaceted scanning engine is preconfigured or configured with rules, policies and/or thresholds, apart from any data source. The multifaceted scanning engine applies rules, policies and in some cases thresholds, to the data source and produces processed content. The processed content can then be output from the multifaceted scanning engine.

Rules encapsulate scan/time criteria which are evaluated at appropriate points during the multifaceted scanning process. Similarly, thresholds can be applied either locally at appropriate points in the multifaceted scanning process or globally for the entire scanning process.

Based on the outcome of the rules and thresholds, policies can be applied to the data source to provide outcomes which can lead to the processed content. Policies can include parsing of the data source and processing segments individually. The segmenting can occur at a single point in the multifaceted scanning engine. Each segment can, in some embodiments, be sent to a different processing entity, such as a different multifaceted scanning engine on a different network node. By only requiring segmenting to occur once, and by providing for distributed processing in some cases, processing requirements and latency are reduced.

Rules, thresholds and/or policies can be preconfigured at the multifaceted scanning engine or can be dynamically updated. Further, dynamic configuration could be done by one entity or by multiple entities, each with an interest in certain aspects of the scanning.

Scanning aspects can include any purpose for which scanning may be required. These include, but are not limited to, content filtering to remove or block content that has been defined as undesirable, virus detection to detect viruses within the content or content scanning for advertisement purposes.

The present disclosure therefore provides a method for multifaceted scanning comprising: receiving a data source; processing the data source for a plurality of scanning aspects, the processing step utilizing rules and policies for the plurality of scanning aspects to provide transformed, modified or adapted content; and outputting the transformed, modified or adapted content.

The present disclosure further provides a multifaceted scanning engine comprising: an input module adapted to receive a data source; a processing module adapted to scan the data source for a plurality of scanning aspects, the processing module adapted to utilize rules and policies for the plurality of scanning aspects to provide transformed, modified or adapted content; and an output module adapted to output the transformed, modified or adapted content.

Reference is now made to FIG. 1. FIG. 1 illustrates a multifaceted scanning engine 110 that receives data from a data source 120 and, based on rules/thresholds 140 and policies 150, produces content 170.

Multifaceted scanning engine 110 is adapted to receive a variety of data sources 120. The data source may be manifested as a file or may exist in a form of an arbitrary datastream with an associated content-type or media identifier. For example, a multi-purpose Internet mail extension (MIME) could be utilized.

The present disclosure is not meant to be limited to a particular data source. Examples of data sources identified in FIG. 1 include internet scripting source 122, a text source 124, a word processing source 126 or 128, an internet stream 130, a graphics source 132, a sound source 133, a compressed data source 134, an encrypted data source 135 or a particular window or other file source 136. These data sources are not limiting and other examples would be known to those skilled in the art.

In one embodiment, data sources are received by multifaceted scanning engine 110 through a data source pipeline 138.

From the above, a data source represents content which is fed as input into the multifaceted scanning engine 110 through a data source pipeline 138. Data sources are typically manifested as arbitrary byte sequences either as part of a protocol message such as MIME type text/hypertext markup language (html) or as part of a response to a hypertext transfer protocol (http) 1.1/GET message to a web server or as part of a file residing on a particular computing device. Examples of files residing on a particular computing device include a flat American standard code for information exchange (ASCII) text file residing as a file on a file system located on a server. Other data sources might be short message service (SMS) messages and/or multimedia message service (MMS) type messages. Either of the above may be manifested as multipart messages (native to their respective protocol data formats) but may include a data source that may be applied to the multifaceted scanning engine.

Characteristics of a data source may include, but are not limited to, the type of data source, the size of the data source, composition of the data source or a file name for the data source. As will be appreciated, the type can include MIME type for arbitrary data sources, file extensions for file based data sources, among others. The composition includes the layout or structure of the data source. The file name is applicable only to file based data sources.

In the present disclosure, a data source received by the multifaceted scanning engine can be defined to be one of a variety of data sources, or in some embodiments can be an arbitrary data source. Thus, in some embodiments, multifaceted scanning engine knows that it can receive one of several types of defined data sources or even only one type of data source. Other types of data sources could never reach multifaceted scanning engine 110 or could be filtered as being unrecognized by multifaceted scanning engine 110.

In other embodiments, multifaceted scanning engine 110 could act on any type of data stream received, and this is referred to herein as acting on an arbitrary data stream.

Multifaceted scanning engine 110 utilizes rules and/or thresholds 140 and policies 150 to scan data sources 120. Multifaceted scanning engine 110 scans the stream of data and tests rules or thresholds to derive an appropriate policy or policies. Rules and thresholds, preferably, are orthogonal in nature and establish a scan time "criteria" for multifaceted scanning. Policies perform some type of action or scan time behavior when a rule or thresholds meets a defined or given criteria. The scanning is performed by multifaceted scanning engine 110 for a plurality of scanning aspects. Examples of such scanning aspects include virus detection, content filtering or scanning for advertisement purposes/relevance.

As used herein, rules, thresholds and policies are defined as follows.

Rules

Rules encapsulate a scan-time criterion that is evaluated at appropriate points in the multifaceted scanning process. Rules provide hints or direction to the multifaceted scanning engine to allow it to come to a definitive conclusion about the specified content. Further, in one embodiment, rules may consist of simple or complex expressions.

Non-limiting examples of rules include:

Rule 1: The data source is a file. For example, the data source can have a file name.

Rule 2: The source matches exactly a string literal. Thus, if the string literal "xyz" appears in the source, this match is found and the rule is satisfied.

Rule 3: The source matches exactly to at least one of the strings in a set. Thus, for example, if the source matches any of {"abc", "DEF", "123", "xyz"}.

Rule 4: Rule 1 and rule 3 must be satisfied. Thus, rules can be defined as a combination of previously defined rules.

From the above, rules can be comparators or provide for the examination of logical expressions.

Thresholds

Thresholds are a variation of a rule and have a specified applicability or scope at scan time. They can be global or local and augment rules to assist the scanning engine with how to proceed during multifaceted scanning.

Non-limiting examples of thresholds include:

Threshold A: The risk level is low;

Threshold B: The risk level is between low and medium; or

Threshold C: The risk level is below 0.15.

A threshold can be local, meaning that it is inserted within a specific location in the data flow to test whether or not the threshold has been met. Alternatively, the threshold can be global, in which case it will act similarly to an interrupt, wherein a global threshold monitor will determine that the threshold has exceeded a predefined parameter, at which point the global threshold policies will take effect.

In one embodiment, a defined threshold with a local scope will override or be executed prior to a threshold with a global scope.

Policies

Policies are actions or outcomes that are applied by the multifaceted scanning engine 110 to a data source 120 when a specified rule and/or threshold has been fulfilled.

Non limiting examples of policies include:

Policy 1: determine the data source type;

Policy 2: detect viruses;

Policy 3: screen content; or

Policy 4: target advertising.

Policies, in one embodiment, can be action verbs that are attached to either side of an outcome.

Multifaceted Scanning Engine

Multifaceted scanning engine 110 utilizes the rules/thresholds 140 and policies 150 to provide content 170 with applied policies. The multifaceted scan engine 110 is a principal component within the multifaceted scanning solution.

In one embodiment, multifaceted scanning engine 110 permits scanning processing and behaviour to vary based on the schema of rules, thresholds and policies as required by a scanning entity. This scanning engine can be updated at any time with new rules/thresholds and policies by the controlling scanning entity.

As will be further appreciated by those skilled in the art, in some embodiments, rules and policies could be used to the exclusion of thresholds and similarly thresholds and policies could be used to the exclusion of rules.

Multifaceted scanning engine 110 can be utilized in both a wired and wireless domain. In a wired domain, the multifaceted scanning engine can be applied on either the server or the client side. For example, multifaceted scanning engine 110 could be located at any network node such as a server or a router. Further, the multifaceted scanning engine 110 could be utilized at a client such as a computer. Similarly, in a wireless environment, the multifaceted scanning engine could be located at any network element or could be located on a mobile device.

In a further embodiment, multifaceted scanning engine 110 is a logical element that is distributed over various network elements or split between a client side and a server side.

As will be appreciated by those skilled in the art, the controlling entity for multifaceted scanning engine 110 can update multifaceted scanning engine 110 with new rules/thresholds and policies. Further, the controlling scanning entity may consist of multiple entities and each of the multiple entities could control all or part of the scanning engine configuration.

Further, default behavior could be defined in one embodiment to provide for data source processing in the absence of any scanning entity specific definition.

In one embodiment, multifaceted scanning achieves optimized and efficient scanning through the decomposition of data streams into segments and landmarks. As used herein, a segment is a logical chunk or block of a given data source and a landmark is a position or point of significance in a data source. The result of the decomposition is more focused processing which eliminates rescanning of data and reduces erroneous conclusions.

Decomposition or parsing of the data stream 120 is preferably done in a single pass as opposed to multiple passes required in prior solutions. As will be appreciated by those skilled in the art, the multifaceted approach is useful, especially in a wireless environment, where processor power and battery life are critical resources.

The output from multifaceted scanning engine 110 is content 170. Content 170 includes the data source 120 with applied policies from multifaceted scanning engine 110.

In the example of FIG. 1, content 170 includes blocked/dropped content 172, filtered content 174 and targeted advertising based on content 176. As will be appreciated by those skilled in the art, this is not limiting and content could be transformed, modified or adapted from a data source 120 based on a variety of applied policies.

In the examples of FIG. 1, block/dropped content could include content that does not meet criteria because of viruses or due to the nature of the content. This could include, but is not limited to, adult content that has been blocked based on policies 150.

Similarly, filtered content 174 could include content in which certain data has been removed based on policies 150.

Targeted advertising based on content 176 could include advertising that is adapted for the particular content. Thus, if a mobile device user has, for example, subscribed to advertising, the advertising could be targeted to the user based on the content that the user is creating or consuming.

The content 170 illustrated in FIG. 1 is not limiting and other content would be evident to those skilled in the art having regard to the present disclosure.

Figure 2:
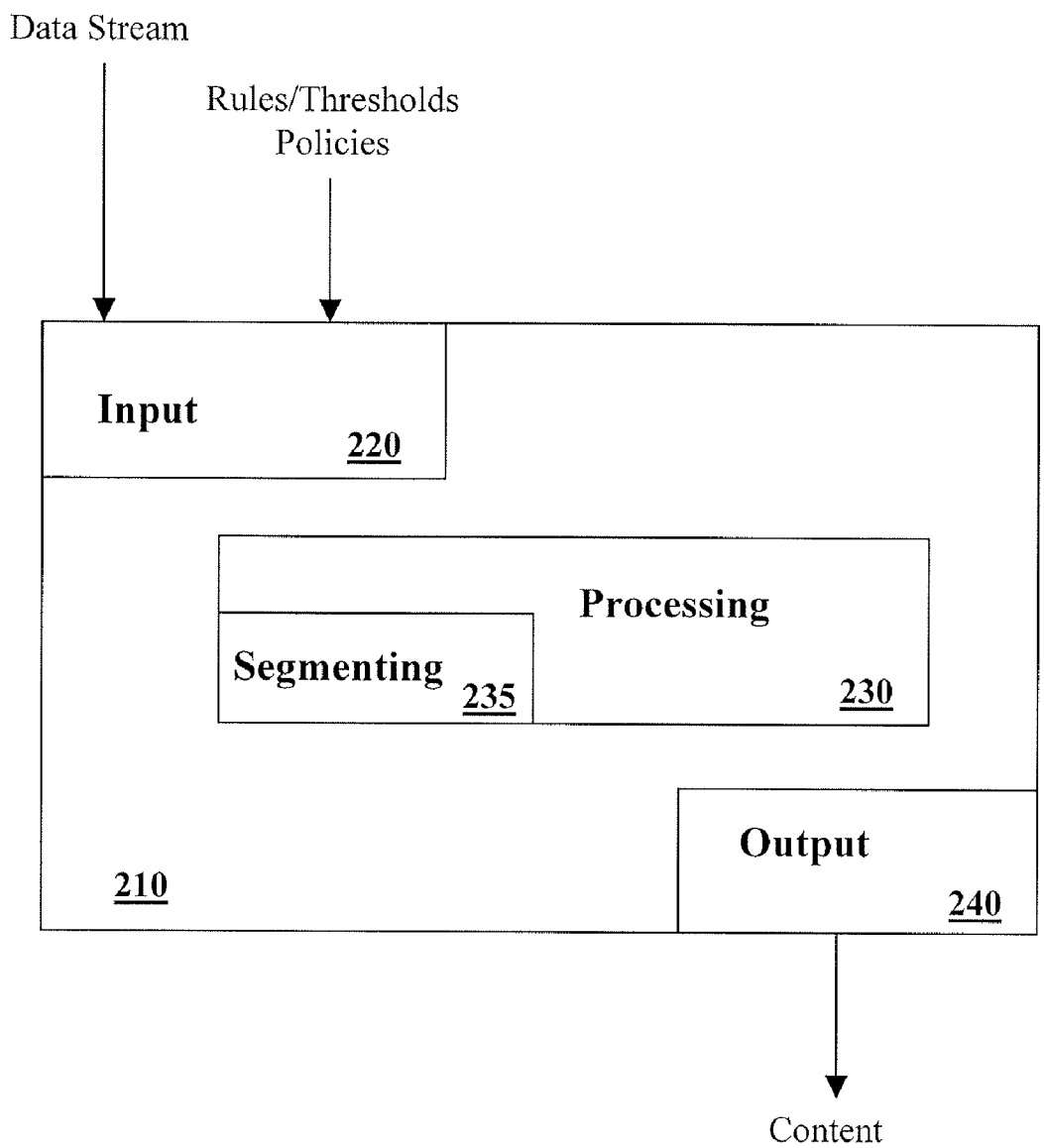
FIG. 2 is a block diagram showing logical components within a multifaceted scanning engine.

Reference is now made to FIG. 2. FIG. 2 shows a block diagram of an exemplary multifaceted scanning engine 210 having various logical components.

Multifaceted scanning engine 210 includes an input module 220. Input module 220 is adapted to receive data streams or sources, such as data stream 120 from FIG. 1.

In one embodiment, input 220 is further adapted to receive rules/thresholds or policies, such as rule/thresholds 140 or policies 150 from FIG. 1. As will be appreciated, in other embodiments, rules/thresholds or policies could be preconfigured on multifaceted scanning engine 210.

Multifaceted scanning engine 210 further includes a processing module 230 adapted to apply rules/thresholds and policies to a data source received by input module 220. In one embodiment, processing module 230 includes a segmenting module 235 to divide a data source into segments. Segmenting module 235 could, in one embodiment, use landmarks associated with a content type to divide the data source. However, in some embodiments landmarks are not necessary.

Multifaceted scanning engine 210 further includes an output module 240 adapted to output content that policies have been applied to.

As will be appreciated by those skilled in the art, the logical elements in FIG. 2 can be configured in a variety of ways and other modules can be added to multifaceted scanning engine 210. Further, the modules of FIG. 2 are logical modules and each can be located on a single network element or could be distributed among various network elements.

Figure 3:
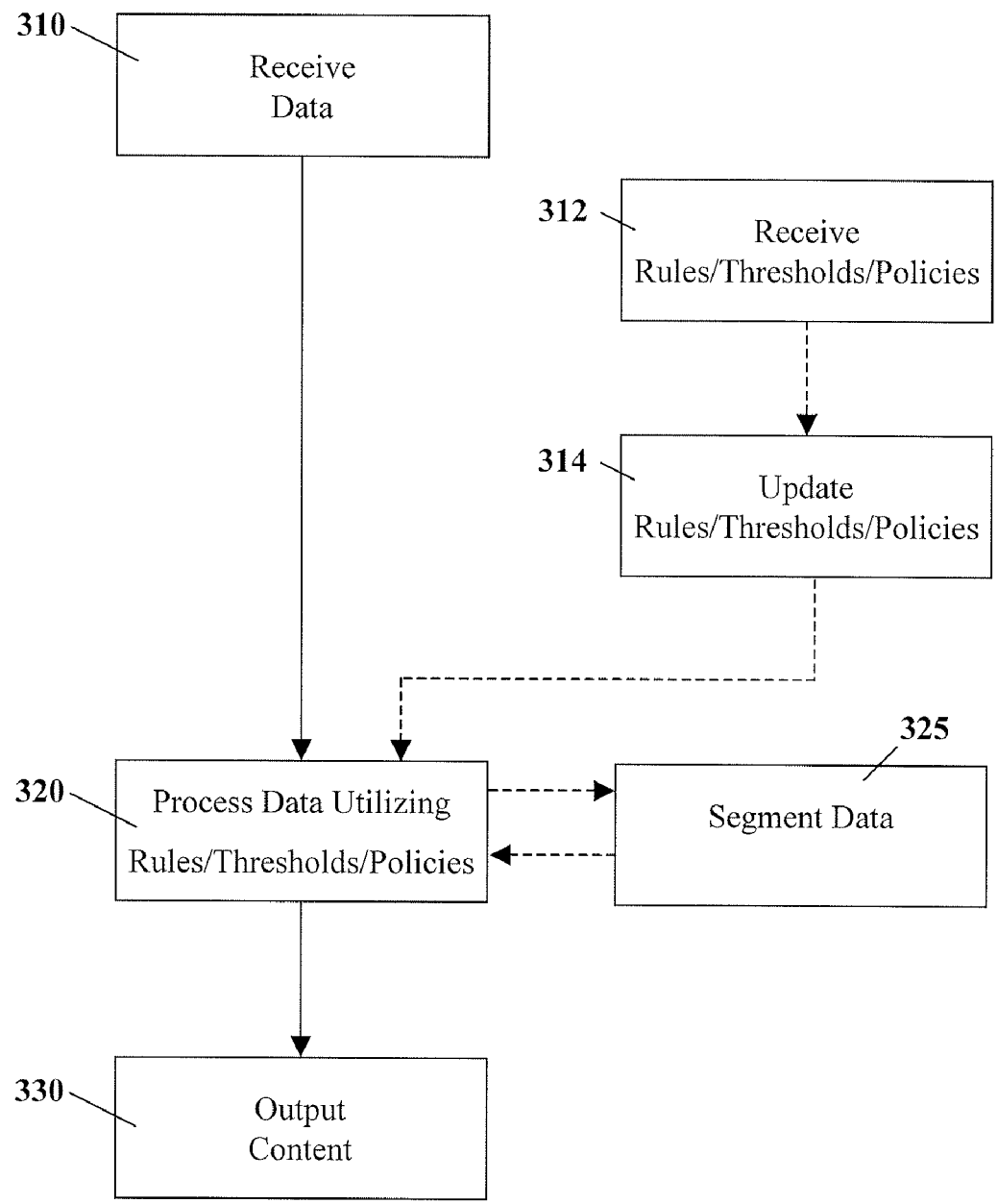
FIG. 3 is a flow diagram of a method according to the present disclosure.

Reference is now made to FIG. 3. FIG. 3 illustrates a simplified flow chart of a method according to the present disclosure. In particular, in step 310, the multifaceted scanning engine receives data. As indicated above, the data can be from a variety of data source types and in some embodiments can be an arbitrary data source type.

The process then proceeds to step 320 in which the data received in the step 310 is processed utilizing rules or thresholds. These rules/thresholds can be predefined or can be received.

In particular, in step 312 the multifaceted scanning engine receives rules/thresholds or policies and in step 314 the rules/thresholds or policies of the multifaceted scanning engine are updated. These updated rules/thresholds and/or policies are then utilized in processing step 320 for data received at step 310.

Data that has been processed at step 320 is then output as content in step 330. Such content includes the data received in step 310 to which policies have been applied.

As illustrated in FIG. 3, in one embodiment the multifaceted scanning engine can also segment data in association with processing step 320. As will be appreciated, this can be based on landmarks associated with a content type of the data source, but in some embodiments landmarks are not necessary. Further, landmarks can exist in a dictionary, for example, and be edited, reviewed or updated as required. Segmenting is shown as shown in step 325.

FIG. 3 therefore shows a simplified method of processing a data stream and producing content.

Figure 4:
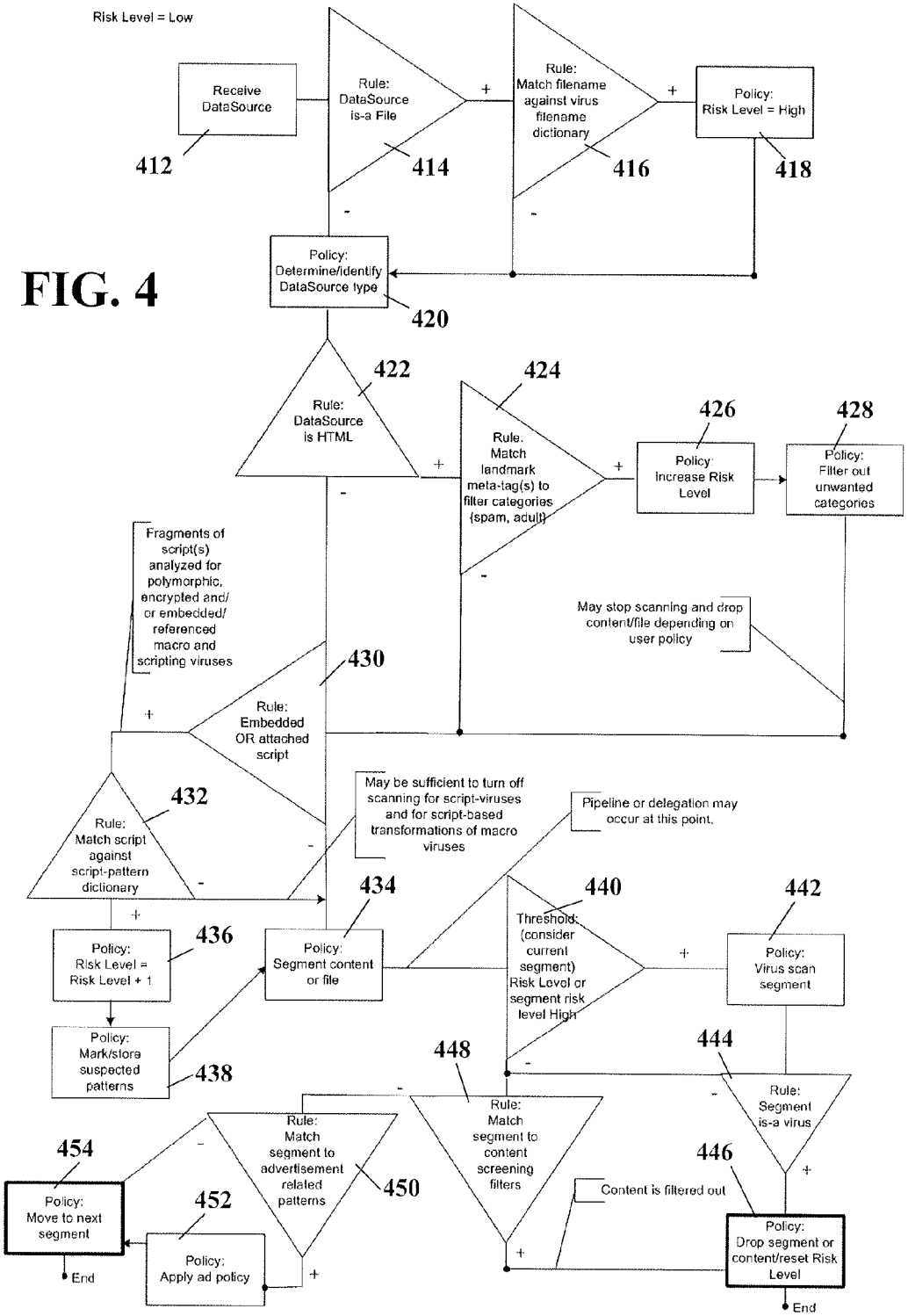
FIG. 4 is a flow diagram of an exemplary embodiment of multifaceted scanning by a multifaceted scanning engine.

Reference is now made to FIG. 4. FIG. 4 is a flow chart of exemplary multifaceted scanning and process flow, and is an example of steps 320 and 325 from FIG. 3.

At the outset the multifaceted scan engine considers the risk level of any data received to be low.

The process starts at step 412 where the process receives a data source. The process then proceeds to the rule at step 414. The rule at step 414 enquires whether or not the data source received in step 412 is a file.

From step 414, if the data source is a file, the process proceeds to the rule in step 416, where a check is made to see whether or not the file name of the file is matched against a virus file name dictionary.

From step 416, the process proceeds to step 418 in which, if a match against a virus file name dictionary was positive, the policy sets the risk level to high.

From step 414 if the data source is not a file, or step 416 if the file name does not match a virus file name dictionary, or step 418, the process proceeds to step 420. In step 420, a policy exists to derive the data source type.

From the policy in step 420 the process proceeds to the rule at step 422 in which a check is made to see whether the data source is html. As will be appreciated by those skilled in the art, the rule in step 422 is merely exemplary and the particular rule and its associated policies may apply equally to other data sources. Examples include arbitrary metadata such as extended mark-up language (XML) data with embedded key words for targeted advertising, among others.

If, in step 422, the rule is used to find that the data source is html, the process proceeds to step 424 in which landmark metatags are matched to filter categories. Such filter categories include, but are not limited to, spam or adult content. As will be appreciated, the use of metatags can be a first filtering step.

If, in step 424, the rule finds that metatags do match certain filter categories, the process proceeds to step 426 in which a policy is utilized to increase the risk level and the process then proceeds to step 428 in which unwanted categories are filtered out.

As will be appreciated by those skilled in the art, the scanning could end at step 428 if the content or file is filtered based on unwanted content.

Conversely, from step 422 if the data source is not html, from step 424 if there are no matches between the landmark metatags in certain categories or from step 428, the process proceeds to the rule at step 430 in which a check is made for embedded or attached scripts.

If embedded or attached script is included, the process then proceeds to the rule at step 432 in which the script is matched against a script pattern dictionary. In this case, fragments of script can be analyzed for polymorphic encrypted and/or embedded referenced macro and scripting viruses.

If no embedded or attached script is found by the rule at step 430 or if the script is not matched against a script pattern dictionary by the rule at step 432, the process proceeds to step 434, which is a policy requiring the segmentation of the content or a file.

Conversely, if the script matches against a script pattern dictionary in step 432, the process proceeds to the policy at step 436 in which the risk level is raised. The process then proceeds to the policy at step 438 in which the suspected patterns are marked or stored.

From step 438 the process proceeds to the policy in step 434 for segmenting the content or file. As will be appreciated by those skilled in the art, once the content is segmented, individual segments could be sent to other entities or multifaceted scanning engines for processing. This allows for distribution of processing and can reduce latency for the multifaceted scanning engine.

From step 434, the process proceeds to a threshold in step 440. The threshold's check of step 440 determines whether the risk level has advanced to a certain minimal threshold. In the example of FIG. 4, the minimal threshold is a high risk level. If this threshold is met, the process proceeds to step 442. In step 442, a virus scan is initiated on the segment.

The process then proceeds to step 444 in which a check is made to see whether the segment is a virus. If yes, the process proceeds to step 446 in which the segment is dropped. Otherwise, the process proceeds to step 448 in which the segment is checked against content screening filters. The process could also proceed to step 448 from step 440 if the threshold does not find that the risk level is high, but the content matches the given segment to content screening filters.

In step 448, the screening filters applied could include, for example, the age of the content or certain categories of content. Thus, for example, if a news feed is older than a certain value then the content could be filtered out. Also if the category of the content is unacceptable to a user or to a scanning entity, then the process proceeds back to step 446 in which the segment or content is dropped and the risk level is reset to low.

From step 448, if the segment does not match a content screening filter, the process proceeds to step 450 in which the segment is checked whether it matches advertising related patterns. If yes, the process proceeds to step 452 in which an advertising policy is applied to the segment and from step 450 or step 452, the process then proceeds to step 454 in which the policy is to move to the next segment, if such a segment exists, or the process could end if there are no other segments.

From step 446, the process could also move to the next segment if another segment exists.

As will be seen from the example of FIG. 4, multifaceted scanning provides for advantages over prior solutions. Specifically, in the example of FIG. 4, segmenting only occurs in step 434 and then the scanning policies apply to each segment resulting from the segmenting of the content or file in step 434. This reduces the number of times the content is segmented for scanning, saving processing resources and time.

Further, each segment can be distributed among various multifaceted scanning engines within a network to further reduce latency.

Further, the ordering of various steps prevents conflicting results or race conditions from occurring. Specifically, if a user was applying a virus scan and an ad policy scan separately to a data source, the virus scan might detect a virus and filter out the content while the ad scanning might find ad appropriate material and insert an advertisement. This could create a problem for the end user. This is merely one example and other examples of advantages would be evident to those skilled in the art having regard to the present disclosure.

Figure 5:
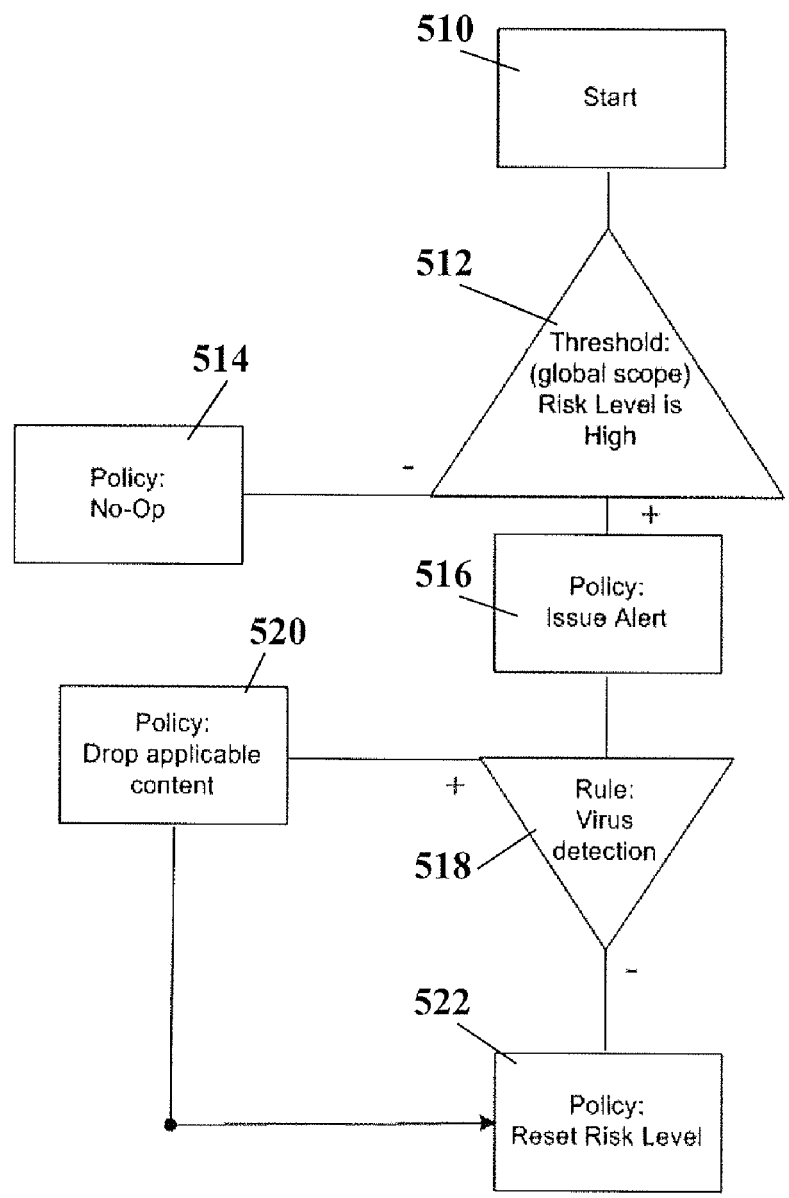
FIG. 5 is a flow diagram showing the utilization of a global threshold for a multifaceted scanning engine.

Reference is now made to FIG. 5. In addition to the policy and rules/thresholds of FIG. 4, a global threshold can be set to monitor aspects of the scanning. In the example of FIG. 5, the global threshold is the risk level. Thus, in FIG. 5, the process starts at step 510. The process then proceeds to step 512 in which the global scope threshold is checked to see whether or not the risk level is high. If not, the process proceeds to step 514 in which no operation is performed. As will be appreciated by those skilled in the art, the process of FIG. 5 should only be started when the risk level is high and therefore the check of step 512 and the no-op step of 514 should be redundant.

If the global threshold that the risk level is high is found in step 512, the process proceeds to step 516 in which the policy is to issue an alert. This could be an alarm, a message on a screen or an insertion into a data log, among others. Further, the alert could stop the process altogether, halting scanning.

If the process is not halted at step 516, the process then proceeds to step 518 in which virus detection is performed. If, in step 518 a virus is detected the process proceeds to step 520 in which the applicable content is dropped. The process then proceeds to step 522 in which the risk level is reset.

Conversely, if a virus is not detected in step 518 the risk level is reset at step 522.

As will be appreciated with reference to FIG. 5, a global threshold behaves like a guard and is executed at appropriate points by the multifaceted scanning engine. Execution is done in the background and its applicability covers the entire scope of the multifaceted scanning process and thus can be initiated at any point during the scan.

In one embodiment, the global threshold may be impacted by a locally executing threshold, in which case the locally executing threshold could take precedence.

Based on the above, a multifaceted scan engine is adapted to perform scanning against a variety of data sources and to carry out different scanning aspects, including virus scanning, content categorization and targeted advertisement, among others. Rules and thresholds are used to derive appropriate policies and establish scan time criteria for multifaceted scanning. Policies perform some type of action or scan time behaviour when a rule and/or threshold meets a defined or given criteria.

Multifaceted scanning, in one aspect, achieves optimized and efficient scanning by the decomposition of data streams into segments and landmarks. The result is more focused processing, which eliminates rescanning of data and reduces erroneous conclusions. The approach is applicable to both the wired and wireless domains and improves user experience by reducing latency of presenting the content to the user or application. The processing time savings come from parsing the content in one pass as opposed to multiple passes. The multifaceted approach is especially important to the wireless domain where processor power and battery life are critical resources.

If the scan engine is implemented on a mobile device, any mobile device can be used. One exemplary mobile device is illustrated with reference to FIG. 6.

Figure 6:
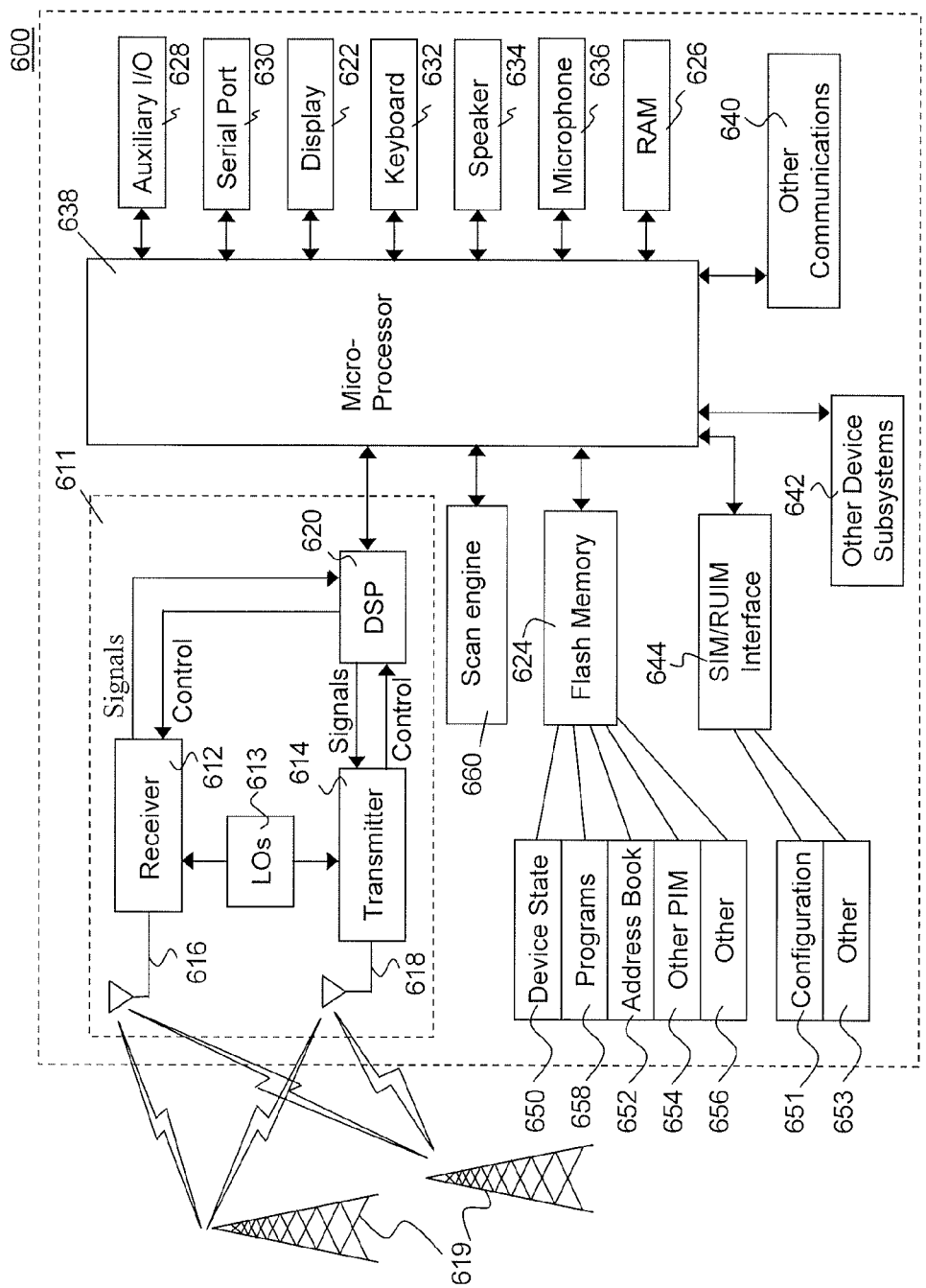
FIG. 6 is a block diagram of an exemplary mobile device apt to be used with the present method and system.

FIG. 6 is a block diagram illustrating a mobile station apt to be used with preferred embodiments of the apparatus and method of the present application. Mobile station 600 is preferably a two-way wireless communication device having at least voice and data communication capabilities. Mobile station 600 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 600 is enabled for two-way communication, it will incorporate a communication subsystem 611, including both a receiver 612 and a transmitter 614, as well as associated components such as one or more, preferably embedded or internal, antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some CDMA networks network access is associated with a subscriber or user of mobile station 600. A CDMA mobile station may require a removable user identity module (RUIM) or a subscriber identity module (SIM) card in order to operate on a CDMA network. The SIM/RUIM interface 644 is normally similar to a card-slot into which a SIM/RUIM card can be inserted and ejected like a diskette or PCMCIA card. The SIM/RUIM card can have approximately 64K of memory and hold many key configuration 651, and other information 653 such as identification, and subscriber related information.

When required network registration or activation procedures have been completed, mobile station 600 may send and receive communication signals over the network 619. As illustrated in FIG. 6, network 619 can consist of multiple base stations communicating with the mobile device. For example, in a hybrid CDMA 1x EVDO system, a CDMA base station and an EVDO base station communicate with the mobile station and the mobile station is connected to both simultaneously. The EVDO and CDMA 1x base stations use different paging slots to communicate with the mobile device.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile station 600 preferably includes a microprocessor 638 which controls the overall operation of the device. Communication functions, including at least data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 is preferably stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Microprocessor 638, in addition to its operating system functions, preferably enables execution of software applications on the mobile station. A predetermined set of applications that control basic operations, including at least data and voice communication applications for example, will normally be installed on mobile station 600 during manufacturing. Other applications could be installed subsequently or dynamically.

A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 619. In a preferred embodiment, the PIM data items are seamlessly integrated, synchronized and updated, via the wireless network 619, with the mobile station user's corresponding data items stored or associated with a host computer system. Further applications may also be loaded onto the mobile station 600 through the network 619, an auxiliary I/O subsystem 628, serial port 630, short-range communications subsystem 640 or any other suitable subsystem 642, and installed by a user in the RAM 626 or preferably a non-volatile store (not shown) for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the mobile station 600.

In a data communication mode, a received signal such as a text message or web page download will be processed by the communication subsystem 611 and input to the microprocessor 638, which preferably further processes the received signal for output to the display 622, or alternatively to an auxiliary I/O device 628.

A user of mobile station 600 may also compose data items such as email messages for example, using the keyboard 632, which is preferably a complete alphanumeric keyboard or telephone-type keypad, in conjunction with the display 622 and possibly an auxiliary I/O device 628. Such composed items may then be transmitted over a communication network through the communication subsystem 611.

A scan engine 660 could be equivalent to multifaceted scan engines 110 or 210 from FIGS. 1 and 2 and could be executed on processor 638 in one embodiment. In this case, communications subsystem 611 could be utilized as an input module to receive a data source, rules, policies or thresholds. Further, keyboard 632, auxiliary I/O device 628, other communications 640, microphone 636, serial port 630 and/or other device subsystems 642 could form part of the input module. Output module could consist of one or more of the communications subsystem 611, auxiliary I/O device 628, other communications 640, speaker 634, display 622, serial port 630 and/or other device subsystems 642. As will further be appreciated, scan engine could be part of flash memory 624.

For voice communications, overall operation of mobile station 600 is similar, except that received signals would preferably be output to a speaker 634 and signals for transmission would be generated by a microphone 636. Alternative voice or audio I/O subsystems, such as a voice message recording subsystem, may also be implemented on mobile station 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6, would normally be implemented in a personal digital assistant (PDA)-type mobile station for which synchronization with a user's desktop computer (not shown) may be desirable, but is an optional device component. Such a port 630 would enable a user to set preferences through an external device or software application and would extend the capabilities of mobile station 600 by providing for information or software downloads to mobile station 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, is a further optional component which may provide for communication between mobile station 600 and different systems or devices, which need not necessarily be similar devices. For example, the subsystem 640 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for multifaceted scanning comprising:
receiving a data source;
using a policy to process the data source for a plurality of scanning aspects to provide transformed, modified or adapted content, the policy being used if a rule associated with the policy is satisfied by the data source, the rule being configured to check for one of inappropriate content, viruses, and advertisement relevance; and
outputting the transformed, modified or adapted content, wherein the policy relates to an action of screening content, detecting viruses or targeting advertising relative to the rule.

2. The method of claim 1, wherein the rule and policy are set dynamically.

3. The method of claim 1, wherein the rule and policy are preconfigured.

4. The method of claim 2, wherein the rule and policy are set by one or a plurality of entities.

5. The method of claim 1, wherein the data source is an arbitrary data source.

6. The method of claim 1, wherein the data source is one of a plurality of defined data sources.

7. The method of claim 1, wherein the rule associated with the policy compares a value to a threshold.

8. The method of claim 7, wherein thresholds that apply locally take precedent over thresholds that apply globally.

9. The method of claim 1, wherein the using step further comprises segmenting the data source at only one point.

10. The method of claim 9, wherein the segmenting is based on landmarks associated with a data source type.

11. The method of claim 9, wherein segments created by the segmenting step are distributed to a plurality of processing entities for processing.

12. The method of claim 1, wherein the multifaceted scanning occurs on a network element in a wireless communications network.

13. A multifaceted scanning engine comprising:
an input module configured to receive a data source;
a processing module configured to scan the data source for a plurality of scanning aspects, the processing module using a policy to provide transformed, modified or adapted content, the policy being used if a rule associated with the policy is satisfied by the data source, the rule being configured to check for one of inappropriate content, viruses, and advertisement relevance; and
an output module adapted to output the transformed, modified or adapted content,
wherein the policy relates to an action of screening content, detecting viruses or targeting advertising relative to the rule.

14. The multifaceted scanning engine of claim 13, wherein the input module is configured to receive rules and policies.

15. The multifaceted scanning engine of claim 13, wherein the data source is an arbitrary data source.

16. The multifaceted scanning engine of claim 13, wherein the data source is one of a plurality of defined data sources.

17. The multifaceted scanning engine of claim 13, wherein the rule associated with the policy compares a value to a threshold.

18. The multifaceted scanning engine claim 13, wherein the processing module is further configured to segment the data source at only one point in the processing step.

19. The multifaceted scanning engine of claim 18, wherein processing module is configured to segment based on landmarks associated with the data source.

20. The multifaceted scanning engine of claim 18, wherein the output module is configured to distribute segments to a plurality of processing entities for processing.

21. The multifaceted scanning engine of claim 13, wherein the multifaceted scanning engine is applied on a network element in a wireless communications network.

* * * * *